3,409,093
METHOD OF DRILLING WELLS
Willis C. Cunningham, Knox A. Slagle, and Dwight K. Smith, Duncan, Okla., assignors to Halliburton Company, Duncan, Okla., a corporation of Delaware
No Drawing. Filed Apr. 17, 1967, Ser. No. 631,126
8 Claims. (Cl. 175—65)

ABSTRACT OF THE DISCLOSURE

This patent relates to a method of drilling a well using a well cementing slurry composition as the drilling fluid.

BACKGROUND OF THE INVENTION

The field of this invention is the technology relating to well drilling fluids and procedures.

In the drilling of wells, normally a rotating drill bit is used. The cuttings produced must be removed from the bore hole to prevent seizure of the bit. The removal of cuttings is accomplished by the use of a drilling fluid which is normally pumped down a hollow drill string within the bore hole, around the bit which is attached to the end of the string, and is then circulated upwardly through the annular space between the string and the bore hole. Circulation of the drilling fluid in this manner removes the cuttings from the bore hole, cools and lubricates the bit, and deposits a thin, sealing layer of solid filter cake on the wall of the bore hole.

Since the deposited filter cake is relatively weak, the well is normally completed by cementing the annulus between the bore hole and the casing to resist sloughing, caving, etc., of the walls of the bore hole, to prevent fluids in upper strata behind the casing from travelling downward around the bottom of the casing and into the well, to protect the casing against collapse due to external pressures and to prevent migration of fluids from one stratum to another.

Previously, various settable drilling fluids have been used in the drilling of wells. For example, United States Patent No. 2,890,169 discloses the use of an emulsified slurry of cement in a hydrocarbon as a drilling fluid. The drilling fluid is deposited on the walls of the bore hole where the emulsion breaks to permit setting of the cement.

United States Patent No. 2,705,050 discloses the use of a drilling fluid which sets or gels after a period of time to minimize the loss of drilling fluid to formations penetrated by the well during drilling operations. The drilling fluid disclosed in this patent consists of a lime-based drilling mud prepared according to rather strict limitations, together with freshly added quick-lime. The essential constituents of the drilling fluid are a water base, clay solids, hydrated lime, lignosulfonates as breakover materials and caustic. Cement may be added to the drilling fluid to increase the gel strength of the final product. According to the patent, the principal function of the cement is to impart greater strength to gel the composition so that the composition will plug passages in formations penetrated by the well.

It is apparent that in the prior art, the settable drilling fluids containing cement have been composed in accordance with rather special formulations involving the use of one or more components of conventional drilling fluids, as well as cement. The use of these components contributes to the cost of drilling and in some cases interferes with the curing of the cement and thereby reduces the strength of the cement sheath.

In contrast thereto, it has now been discovered that an ordinary neat well cementing slurry free from normal drilling fluid components can be used as a drilling fluid for the drilling of bore holes. We have found that the cementing slurries are effective in cooling and cleaning the bit, in carrying away cuttings, and in forming a strong cement sheath, even in unconsolidated formations. In some cases, the need for subsequently cementing in of casing is eliminated. Where casing is used, the present invention permits the use of the same material for drilling and for setting casing.

According to the present invention, the cement slurry drilling fluids deposit cement as a filter cake on the well bore and offer a more rigid support for the hole. After drilling, the completion of the well can be achieved, for example, by lowering a pipe into the cement-like drilling fluid and displacing the slurry from inside the pipe. Cuttings can be removed or, alternatively, intimately blended with this cement to function as an aggregate and left in the annulus.

The present invention is particularly useful in drilling shallow wells consisting of unconsolidated formations or for drilling through certain types of lost circulation. For example, in well completion, well cementing slurries are now available which have a fluid time ranging from 24 to 72 hours, permitting the penetration in loose zones and areas of lost circulation, as well as providing a cement sheath. The fundamental difference in the use of the neat cement slurry as the drilling fluid versus conventional drilling muds is that cement gives a tougher lining to the wellbore, permitting the operator to go deeper with a minimum of caving or sloughing.

SUMMARY OF THE INVENTION

Briefly, the present invention comprises a method of simultaneously drilling a well and depositing on the walls thereof a strong impermeable sheath comprising circulating in said well a drilling fluid comprising a neat well cementing slurry, and contacting the formations penetrated by the well with said drilling fluid during drilling operations to deposit a cement filter cake on the wall of said well to form a strong impermeable cement sheath bonded to said formation.

The invention further comprises a method of drilling and completing a well which comprises circulating in said well a drilling fluid comprising a neat well cementing slurry, contacting the formations penetrated by the well with said drilling fluid during drilling operations, setting casing in the well containing the cement slurry, displacing the slurry from inside the casing, and permitting the cement in the annulus between the casing and the bore hole to set.

In carrying out the present invention, a conventional neat well cementing slurry composition is first formed by combining cement, water and conventional cement slurry additives such as bentonite, water loss additives, and retarders, and mixing until a homogeneous slurry is obtained. Drilling operations are then conducted, normally using the rotary drilling method in which a hollow drill string carrying a drill bit on its lower end is rotated to form a bore hole. As the drill bit is rotated forming the bore hole, the cement slurry is circulated down the drill string and out through the bit and up the annulus between the string and the walls of the bore hole. The cement slurry forms a wet sheath on the walls of the bore hole. The water in the wet sheath reacts with the cement in a hydration reaction to bring about the setting of the cement and the formation of a hard cement sheath bonded directly to the formation which is of sufficient strength to maintain the walls of the bore hole against caving or sloughing. For further strength, casing may be set in the well. Since the drilling fluid is already present, the casing can be set in the bore hole containing the cement slurry drilling fluid following drilling, and any excess slurry displaced from inside the casing. Another method of setting the casing after drilling with the neat cement slurry involves the use of a backpressure valve (float shoe and/or float collar) whereby the casing is lowered into the wellbore, displacing cement slurry. In this way, it is not necessary to displace slurry inside the casing. In still another procedure, a cement sheath may be permitted to form, after which the casing is cemented into the well.

It is an object of the present invention to provide a novel method for the drilling of a bore hole through an earth formation using a neat well cementing slurry.

Yet another object of the present invention is to provide a method of drilling wells to provide a cement cake on the surface of the bore hole capable of providing strength to the walls of the bore hole.

It is also an object of the invetntion to permit simultaneous drilling and formation of a strong cement sheath on the walls of the bore hole.

In one aspect of the invention, it is an object thereof to use a neat well cementing slurry as a drilling fluid and thereby eliminate the need for well casing.

These and other objects and advantages of the invention will be apparent from the more detailed description which follows.

DESCRIPTION OF PREFERRED EMBODIMENTS

In some situations, the cement cake can be used to support the wall of the bore hole for a temporary well, and thereby eliminate the need for a casing. In any case, by the use of such cement slurries for drilling, bonding of the cement in the subsequent installation of casing to the cement-like formation produced by the cement drilling fluid is much more tenacious than bonding of cement to mud-cake. In certain cases, it is desirable to kill the set of the cement drilling fluid altogether and thereby produce a cement filter cake on the bore hole surface, which becomes hard simply by the loss of water.

The following example is provided solely to illustrate the present invention and should not be regarded as limiting in any way.

Example

The cementing composition used to drill the well was API class A cement containing 8% bentonite, 1.25% CFR–2 and 0.8% HR–7 mixed at a slurry weight of 13.6 pounds per gallon. The bit used was a Hughes OSC–3A, which is a tri-cone jet bit using $9/32''$ nozzles. Drilling was done with a small Failing rig using one drill collar for weight and circulating with either a moyno or Halliburton A-C pump. Cutting removal was accomplished by gravity settling in pits and tank.

Drilling was conducted with an OSC–3A bit, utilizing $9/32''$ jet maintaining a circulation pressure of 600 to 900 p.s.i.g. at a flow rate of 70–90 gallons per minute. These conditions proved to be satisfactory for making hole at a rate of around 20 feet per hour from a depth of 60 feet to total depth of 303 feet. During four different days of drilling, the cement slurry tended to increase its slurry weight 0.2 pound per gallon, regardless of the amount of hole cut. And that could be brought about by the addition of cuttings to the cement slurry which would lower the slurry weight slightly while the loss of filtrate from the cement slurry due to deposition of solids on the wellbore or by evaporation in the circulating tank would result in an increase in slurry weight. A slight viscosity increase was noticed during drilling because of inadequate separation of cuttings from cement slurry. However, this did not effect drilling to any extent with an increase in viscosity of around 20 centipoises. The slurry loss could not be calculated as the well was drilled because of the addition or retention of cuttings in the slurry. Good wall stabilization was achieved throughout drilling and in blowing the hole down, cement filter cake was recovered which showed a deposition of $1/32''$. The cement sheath was well bonded to both the red bed and sands on the retrieved samples.

The present invention is applicable to the full range of well cementing slurries familiar to those skilled in the well completion art. Any one of the eight API classes, i.e., A, B, C, D, E, F, G, or H, are suitable. Retarders, bentonite and other conventional additives may be employed. The amount of retarder used is dependent upon the type of cement and the depth of the well being drilled, since the cement must be kept fluid until drilling is completed. The selection of the retarder concentration to maintain fluidity for any given drilling time is already known to those skilled in the art, and need not be further described herein. Typical suitable retarders include calcium lignosulfonates, carboxymethyl cellulose, hydroxyethyl cellulose, and organic acids. One type of suitable calcium lignosulfonate is that disclosed in United States Patent No. 3,053,673.

In the practice of the present invention, small effective amounts of water-loss additives familiar to those skilled in the art can also be used.

The rheological properties, particularly the viscosity, of the neat cementing slurry is governed by two principal factors, i.e., the viscosity should be as low as possible to minimize circulation pressure but still sufficiently high to hold the cuttings in suspension. For the most part, the particular formation being drilled dictates the viscosity. Thus, in some cases, the slurry may contain cement in such an amount that its viscosity approaches that of water, in others a heavy slurry will be required to suspend cuttings. Typically, the water/cement ratio in the slurry ranges about 3 gallons of water/sack of cement for a heavy slurry to about 42 gallons of water/sack of cement in a light slurry. Even lighter slurries can be used for drilling, although a heavier slurry is required to cement the casing.

The use of bentonite (normally from 0 to 15% by weight of cement) aids in controlling fluid loss during drilling.

As will be evident to those skilled in the art, the present invention provides several significant advantages in the drilling and completing of wells. The use of neat cementing slurry as a drilling fluid is substantially cheaper than conventional drilling fluids, and in many situations eliminates the need for casing. When casing is used, its installation is simplified since the drilling fluid is used for the cementing of the casing. Many variations of the invention are possible. For example, drilling can be started with conventional drilling muds prior to drilling with the cementing slurries.

Having fully described the invention, it is intended that it be limited only by the lawful scope of the appended claims.

We claim:

1. The method of simultaneously drilling a well and depositing on the walls thereof a strong impermeable sheath comprising circulating in said well a drilling fluid consisting essentially of a neat well cementing slurry, and contacting the formations penetrated by the well with said drilling fluid during drilling operations to deposit a cement filter cake on the wall of said well to form a strong impermeable cement sheath bonded to said formation.

2. The method of claim 1 wherein the cementing slurry contains bentonite.

3. The method of claim 1 wherein the cementing slurry contains from about 3 to about 42 gallons of water per sack of cement.

4. The method of claim 1 wherein the cementing slurry contains a retarder.

5. The method of drilling and completing a well which comprises circulating in said well a drilling fluid comprising a neat well cementing slurry, contacting the formations penetrated by the well with said drilling fluid during drilling operations, setting casing in the well containing the cementing slurry, displacing the slurry from inside the casing, and permitting the cement in the annulus between the casing and the bore hole to set.

6. The method of claim 5 wherein the cement in the annulus contains cuttings as an aggregate.

7. The method of claim 5 wherein the cementing slurry contains from about 3 to about 42 gallons of water per sack of cement.

8. The method of drilling and completing a well which comprises simultaneously drilling a well and depositing on the walls thereof a strong impermeable sheath comprising circulating in said well a drilling fluid comprising a neat well cementing slurry, and contacting the formations penetrated by the well with said drilling fluid during drilling operations to deposit a cement filter cake on the wall of said well to form a strong impermeable cement sheath bonded to said formation, subsequently setting casing in the well and cementing the casing to said cement sheath.

References Cited

UNITED STATES PATENTS

| | | | |
|---|---|---|---|
| 2,041,086 | 5/1936 | O'Brien | 166—29 |
| 2,427,683 | 9/1947 | Ludwig | 166—31 X |
| 2,582,459 | 1/1952 | Salathiel | 166—31 X |
| 2,642,268 | 6/1953 | Armentrout | 175—72 |
| 2,705,050 | 3/1955 | Davis et al. | 175—72 X |
| 2,848,340 | 8/1958 | Haldas | 166—31 X |
| 2,890,169 | 6/1959 | Prokop | 175—72 X |

STEPHEN J. NOVOSAD, *Primary Examiner.*